(12) United States Patent
Reneker et al.

(10) Patent No.: US 7,147,694 B2
(45) Date of Patent: Dec. 12, 2006

(54) FIBROUS MEDIA UTILIZING TEMPERATURE GRADIENT AND METHODS OF USE THEREOF

(76) Inventors: Darrell Reneker, 300 Hampshire Rd., Akron, OH (US) 44313; Alexander L. Yarin, 11/15 Oren Street, 34731 Haifa (IL); Wenxia Liu, 3726 B E. Patterson Rd., Beavercreek, OH (US) 45430

(*) Notice: Subject to any disclaimer, the term of this patent is extended or adjusted under 35 U.S.C. 154(b) by 247 days.

(21) Appl. No.: 10/466,970

(22) PCT Filed: Jan. 22, 2001

(86) PCT No.: PCT/US01/02146

§ 371 (c)(1),
(2), (4) Date: Dec. 18, 2003

(87) PCT Pub. No.: WO02/058816

PCT Pub. Date: Aug. 1, 2002

(65) Prior Publication Data

US 2004/0083698 A1    May 6, 2004

(51) Int. Cl.
*B01D 46/00* (2006.01)

(52) U.S. Cl. ............................. 95/283; 95/273; 95/278; 55/428; 55/490.1; 55/498; 55/524; 55/527; 55/528; 55/DIG. 25

(58) Field of Classification Search .................. 55/282, 55/282.2, 282.4, 282.5, 283, 301, 304, 428, 55/490.1, DIG. 25, 498, 524, 527, 528; 95/273, 95/278, 282, 283, 285
See application file for complete search history.

(56) References Cited

U.S. PATENT DOCUMENTS

| | | | | |
|---|---|---|---|---|
| 4,251,238 A | * | 2/1981 | Claes et al. | 95/278 |
| 4,818,257 A | * | 4/1989 | Kennedy et al. | 95/286 |
| 5,045,094 A | * | 9/1991 | Paranjpe | 95/273 |
| 5,129,923 A | * | 7/1992 | Hunter et al. | 95/273 |
| 5,261,946 A | * | 11/1993 | Overby | 55/282.2 |
| 5,551,971 A | * | 9/1996 | Chadderton et al. | 95/278 |
| 5,948,146 A | * | 9/1999 | Thomaides et al. | 95/273 |

* cited by examiner

*Primary Examiner*—Jason M. Greene
(74) *Attorney, Agent, or Firm*—Roetzel and Andress; George W. Moxon, II

(57) ABSTRACT

A method for removing a liquid from a gas, comprises passing the gas and the liquid through a network of fibers containing at least one fiber in which a temperature gradient has been induced along at least a portion of the length of the fiber, thereby permitting droplets of the liquid to be captured by the at least one fiber, and wherein the temperature gradient causes migration of the droplets. A method of preventing the fouling of a coalescence filter is also disclosed. The method comprises inducing a temperature gradient along at least a portion of a length of at least one fiber within the filter, wherein the temperature gradient causes migration of liquid droplets captured by the fiber. A coalescence filter medium comprising at least one fiber in which a temperature gradient has been induced along at least a portion of the length of the fiber is also provided.

28 Claims, 3 Drawing Sheets

Figure 1:
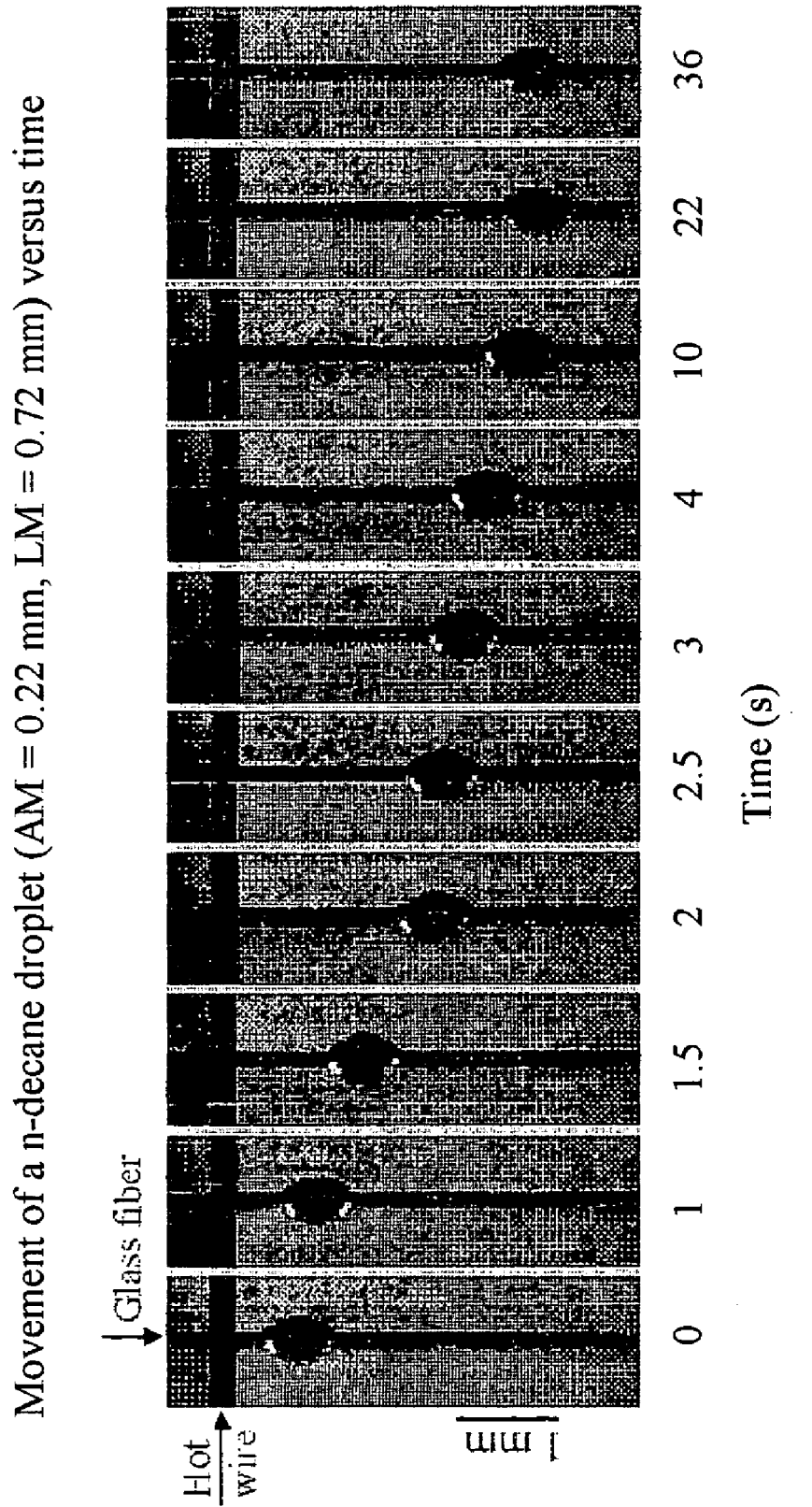

Movement of a n-decane droplet (AM = 0.22 mm, LM = 0.72 mm) versus time

FIBROUS MEDIA UTILIZING TEMPERATURE GRADIENT AND METHODS OF USE THEREOF

This invention was made with government support under cooperative agreements awarded by the National Science Foundation. The U.S. government may have certain rights to the invention.

BACKGROUND OF THE INVENTION

This invention relates to filtration. More particularly, this invention relates to coalescence filtration. Specifically, this invention relates to removal of liquid from coalescence filters using a temperature gradient to cause the migration of liquid droplets from the fibers of the filter.

There are a number of applications where it is desirable or even necessary to remove a liquid component of a gas stream. These include industrial applications such as electric power generation, coal gasification, distillation, refrigeration and the like. In such applications, presence of liquid in a gas stream may interfere with the operation of downstream equipment or processes. Alternatively, it may be desired to remove a liquid component from a gas stream prior to release into the atmosphere, or because the recovered liquid is valuable.

Previous methods for removal of liquid from a gas stream have included traditional coalescence filters, inertial separators and sonic agglomerators. In coalescence filters, droplets of liquid are collected by a filter and must grow to a relatively large size before they are removed by gravity or by aerodynamic forces associated with the gas flow. The pressures necessary for aerodynamic forces to remove accumulated droplets may be so large that the mechanical structure of the filter is degraded. Inertial separators, such as cyclone separators, are generally designed to separate liquid particles from a gas stream by inducing a change in the path of the gas stream and driving the liquid particles against a surface. Liquid droplets may be separated from the carrier gas stream by centrifugal forces and collected separately from the gas. Sonic agglomerators utilize sound waves to cause relatively small particles to agglomerate, forming larger particles which may be more easily removed by other methods such as use of a cyclone separator. Electrostatic precipitators may also be used to separate liquid particles from a gas stream. The above methods are of limited use in certain applications however, such as those involving high temperatures or pressures.

Another method for the filtration of a gas stream which contains liquid particles includes heating the filter to cause the liquid particles to be vaporized, thereby preventing the filter from becoming fouled by accumulated liquid. This method cannot be utilized for inflammable organic solvents or other compounds which would be chemically unstable at the elevated temperature present in the filter. Therefore, there is a need for an alternative method for the filtration of a gas stream which contains liquid particles or vapor.

There are several known models which attempt to explain the behavior of droplets of liquid on a fiber when subjected to a temperature gradient. One of these models uses Marangoni convection. According to this model, surface tension of a liquid typically decreases when temperature increases. Accordingly, Marangoni convection will cause droplets of a liquid on a fiber to move toward the hot end of the fiber.

It can also be speculated that if a droplet on a fiber is subjected to a temperature gradient, the contact angle of the liquid on the hot side of the droplet would increase and become larger than the that on the cold side. This could cause an asymmetry in the drop shape to arise, and a force displacing the droplet toward the cold side would emerge. This model has been shown to be inaccurate, however, because the contact angle of a liquid has been shown to typically decrease with temperature.

Vapor recoil may also be used to attempt to explain movement of a droplet in a temperature gradient. According to this model, evaporating liquid on the hot end of a droplet would create a force which would push a droplet toward the cold end of the fiber. This model, however, does not explain the movement of a droplet in the absence of significant evaporation.

BRIEF SUMMARY OF THE INVENTION

It is, therefore, an aspect of the present invention to provide a method for the filtration of a gas stream which contains liquid particles or vapor.

It has been discovered that droplets of liquid may be induced to migrate along a fiber by a temperature gradient. Within the temperature gradient, the droplets will migrate from a region of greater temperature to a region of lower temperature. This discovery is of particular use when applied to the field of filtration of liquids from a gas stream. This droplet propulsion along the length of the fiber cannot be explained by traditional mechanisms such as Marangoni convection, differences between the contact angle on each side of the droplet, and vapor recoil.

In general, the present invention provides a method for removing a liquid from a gas, comprising passing the gas and the liquid through a network of fibers containing at least one fiber in which a temperature gradient has been induced along at least a portion of the length of the fiber, thereby permitting droplets of the liquid to be captured by the at least one fiber, and wherein the temperature gradient causes migration of the droplets.

Also provided by the present invention is a method of preventing the fouling of a coalescence filter, the method comprising inducing a temperature gradient along at least a portion of a length of at least one fiber within the filter, wherein the temperature gradient causes migration of liquid droplets captured by the fiber.

The present invention also provides a coalescence filter medium comprising at least one fiber in which a temperature gradient has been induced along at least a portion of the length of the fiber.

BRIEF DESCRIPTION OF THE SEVERAL VIEWS OF THE DRAWINGS

FIG. 1 is a series of photomicrographs showing the motion of a large droplet of n-decane under the influence of a temperature gradient.

FIG. 2 is a graph comparing the migration of large and small droplets of n-decane, n-undecane, n-dodecane, and n-hexadecane.

FIG. 3 is a graph showing the volume-equivalent radius of a large and a small droplet of n-decane on a glass fiber over time.

DETAILED DESCRIPTION OF THE INVENTION

The present invention is directed toward a fiber or a network of fibers that may be used as a filter medium for the removal of liquid particles or droplets from a gas, and subsequent removal of the liquid droplets from the network, thereby preventing the network from becoming fouled through accumulation of liquid. The invention also allows for economical recovery and disposal of the separated liquid or recycling or other reuse for value. Such a filter medium may be used as a component of a filter. The network comprises one or more fibers with a diameter between about 0.3 nanometers (the size of a single molecule) to about 1 millimeter. The network is constructed in such a way that a temperature gradient is created along at least a portion of the length of at least one of the fibers of the network. This temperature gradient may be created by one or more heating elements or by one or more cooling elements or both. Preferably, the droplets are induced to move to a collector. The droplets are drained away from the fibers to the collector, thereby preventing fouling of the network and permitting its continued use.

The fibers used in the network of the present invention may be composed of any material in which a temperature gradient can be established at the intended temperature at which an air or gas stream will pass through the network. It would also be necessary for the fibers to be insoluble in the gas and liquid to be filtered. Preferred materials include polymers, silica glass, and ceramics. Additionally, the fibers may be composites of different materials such that the composition of a fiber changes from a material with a high interfacial tension to a material with a low interfacial tension, thereby creating a surface tension gradient in the fiber which would augment a temperature gradient. Alternatively, the fibers may be treated at one end with a surface active material which would diffuse slowly along the length of the fiber. This diffusion would create a gradient in surface properties. Such a gradient would be maintained by the slow removal of the surface active material by the liquid being filtered.

The geometry of the fibers may also be manipulated to augment the removal of droplets from the fibers. Individual fibers may be tapered, for example. Alternative geometries may also be used. For example, fibers with a varied diameter, such that the fibers have a "beaded" appearance, may be created. The behavior of the fibers may also be altered by placing a number of fibers in side-by-side contact with each other.

The fibers may be of any diameter, and the preferred diameter win vary with the application in which the filter is used. Fibers with larger diameters may be desirable in applications where larger droplets of liquid may be expected to be encountered. For example, 100 nanometer diameter fibers would be preferable for removing liquid droplets that are in the range of about 50 nanometers to about 300 nanometers in diameter, while fibers with a diameter of about 800 nanometers would be most useful for removing droplets with a diameter in the range of about 500 to about 2000 nanometers. Larger diameters may also be present when branched fibers are used. For example, it is envisioned that a fiber structure may resemble a tree, with the larger diameter fibers resembling the trunk of a tree. In general, the diameters of the fibers will preferably be between about 3 nanometers and about 60,000 nanometers, more preferably between about 30 and about 3000 nanometers, and even more preferably between about 100 nanometers and about 1000 nanometers.

The temperature gradient created along the fibers may vary according to the particular application in which the filter is used. For example, when the filter is used to remove oil from a stream of air, the difference in temperature between the hotter portion of the fibers and the cooler portion will be at least about 0.1° C. per millimeter, preferably at least 1° C. per millimeter, more preferably at least 3° C. per millimeter, and most preferably at least 10° C. per millimeter.

The filter of the present invention is used by passing a stream of air or gas which contains droplets of liquid through a filter. Droplets of liquid contained in the air or gas stream are captured by the fibers of the filter. A temperature gradient is created within the fibers of the filter, causing the attached droplets to migrate toward the cooler portion of each fiber. The cooler portions of the fibers are optionally attached to a collector, thereby permitting movement of the droplets from the fibers to the collector. The use of the filter of the present invention thereby provides an air or gas stream which has been purified of contaminating droplets of liquid.

As mentioned above, the fibers of the present invention may lead to a collector. The type of collector used may be varied according to the requirements of a particular application. For example, the fiber may be attached to a structure designed to provide a channel for the liquid to move. The force used by the collector to transport liquid may also vary. For example, liquid may be transported by collection channels or the like under the influence of surface tension, gravity, a stream of gas, a second thermal gradient, or a combination of these or other methods. The liquid may be directed to a reservoir, from which the liquid may be removed, for example, by draining or pumping. Alternatively, the liquid may be simply absorbed within the collector or an attached device if the quantity of liquid collected is sufficiently small. Small quantities of liquid may also be polymerized or otherwise reacted or immobilized in the collector or an attached device.

Droplets removed from the fibers of the filter may also be moved by creating a temperature gradient in a liquid phase according to the well known Marangoni convection. In Marangoni convection, the temperature gradient causes the surface tension of the droplet to be different on the hot and cold sides of the droplet. When the derivative of the surface tension coefficient is negative, the droplet will move toward the hot side. Conversely, when the derivative of the surface tension coefficient is positive, the droplet will move toward the cold side. It is also envisioned that use of Marangoni convection could be in conjunction with other collection methods mentioned above such as the use of a collection channel.

The operation of the present invention is demonstrated in the following non-limiting examples. These examples should not be viewed as limiting the scope of the invention. The claims will serve to define the invention.

A piece of nichrome wire (composed of 60% chromium, 16% nickel and 24% iron) served as heating source, which created a temperature gradient in a fiber lying along the direction perpendicular to the wire. The wire was connected to a power supply. The voltage applied to the wire was adjustable, thereby controlling the temperature of wire. A single glass fiber (diameter=120,000 nm) was put in thermal contact with the wire. The axis of the glass fiber was perpendicular to the earth's gravity and to the nichrome wire in this example, although there is no requirement for such an orientation for the invention to operate in the manner described herein. Several kinds of liquids with well defined physical properties, such as n-decane, n-undecane, n-dodecane and n-hexadecane were used in the experiment. Droplets of various diameters of these liquids were deposited one at a time on the fiber, near the position where the hot wire crossed the fiber. When the wire was heated, the motion of the droplet was observed through an optical microscope. Pictures were taken by a video camera, which was connected to the optical microscope.

FIG. 1 shows the motion of a large droplet of n-decane under the influence of a temperature gradient. At time zero, the droplet was at its initial position near the wire. The initial distance of the droplet from the wire in each experiment is shown in Table 1. The distance was measured between the wire and the center of the droplet. The wire was heated quickly to 80° C. The droplet moved away as shown in the successive images. The droplet moved more than 1 mm in 2 seconds. The droplet moved steadily at first, and then moved with a stick-slip motion in the cooler parts of the fiber. After 4 seconds, the droplet had moved 2.3 mm. After 10 seconds, the motion was relatively small. Note that the times at which the droplet positions are shown are not equally spaced. The major movement of the droplet occurred during the first 3 or 4 seconds after the wire was heated. The observed decrease of the droplet size is believed to be due to evaporation of part of the liquid.

Figure 2:
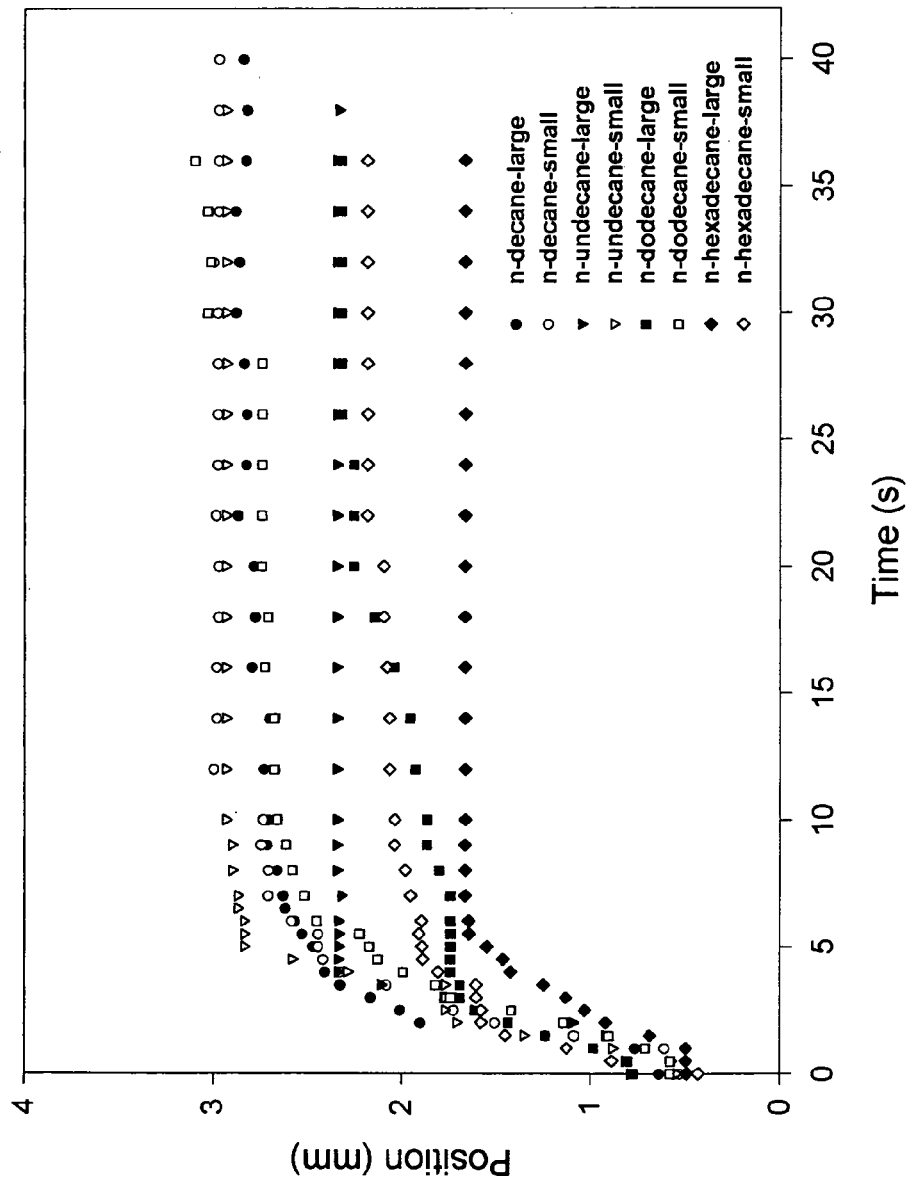

FIG. 2 shows the motion of large and small droplets of four n-alkane molecules (n-decane, n-undecane, n-dodecane, n-hexadecane) that are liquid at room temperature. The sizes and initial positions of the droplets are shown in Table 1. The center of each droplet was defined with reference to the dimensions of the droplet along its long and short axis. The radius of the droplet is called AM, and includes the radius of the fiber. The length of the droplet along the wire is called LM. Smaller droplets generally moved more rapidly than the large ones. The data in FIG. 2 show that droplets composed of many kinds of molecules moved in a temperature gradient. The total distance a droplet moved depended on the size of the droplet and on the kind of the molecules.

Figure 3:
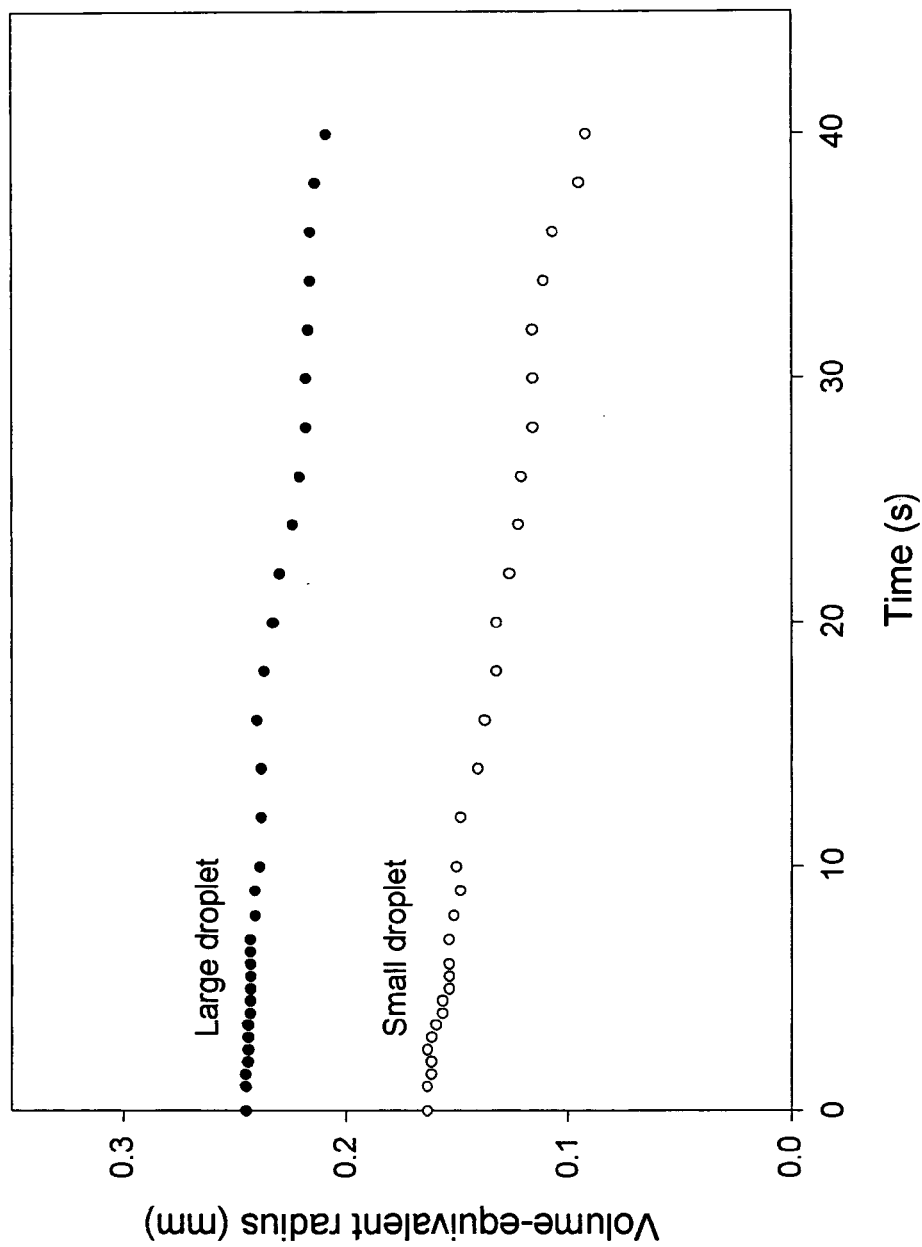

FIG. 3 shows the volume-equivalent radius of the n-decane droplets as a function of time. The volume-equivalent radius was calculated from the measured values of AM, LM, and the radius (60,000 nanometers) of the glass fiber. The volume-equivalent radius decreased steadily, both while the droplet was moving rapidly in the hot part of the fiber and while it was moving more slowly along the cooler part. For the higher molecular weight alkanes (n-undecane, n-dodecane, n-hexadecane), the volume equivalent radius did not change significantly during the experiments.

Droplet movement was also observed using other liquids and other fibers such as 16,000 nanometer diameter "Kevlar"®. Similar behavior was observed for droplets of transmission oil, lubrication oil and vegetable oil. For all the fluids tested, adjacent droplets in the temperature gradient coalesced more rapidly under the influence of the temperature gradient.

Table 1. The distance was measured between the wire and the center of the droplet. The wire was heated quickly to 80° C. The droplet moved away as shown in the successive images. The droplet moved more than 1 mm in 2 seconds. The droplet moved steadily at first, and then moved with a stick-slip motion in the cooler parts of the fiber. After 4 seconds, the droplet had moved 2.3 mm. After 10 seconds, the motion was relatively small. Note that the times at which the droplet positions are shown are not equally spaced. The major movement of the droplet occurred during the first 3 or 4 seconds after the wire was heated. The observed decrease of the droplet size is believed to be due to evaporation of part of the liquid.

FIG. 2 shows the motion of large and small droplets of four n-alkane molecules (n-decane, n-undecane, n-dodecane, n-hexadecane) that are liquid at room temperature. The sizes and initial positions of the droplets are shown in Table 1. The center of each droplet was defined with reference to the dimensions of the droplet along its long and short axis. The radius of the droplet is called AM, and includes the radius of the fiber. The length of the droplet along the wire is called LM. Smaller droplets generally moved more rapidly than the large ones. The data in FIG. 2 show that droplets composed of many kinds of molecules moved in a temperature gradient. The total distance a droplet moved depended on the size of the droplet and on the kind of the molecules.

FIG. 3 shows the volume-equivalent radius of the n-decane droplets as a function of time. The volume-equivalent radius was calculated from the measured values of AM, LM, and the radius (60,000 nanometers) of the glass fiber. The volume-equivalent radius decreased steadily, both while the droplet was moving rapidly in the hot part of the fiber and while it was moving more slowly along the cooler part. For the higher molecular weight alkanes (n-undecane, n-dodecane, n-hexadecane), the volume equivalent radius did not change significantly during the experiments.

Droplet movement was also observed using other liquids and other fibers such as 16,000 nanometer diameter "Kevlar"®. Similar behavior was observed for droplets of transmission oil, lubrication oil and vegetable oil. For all the fluids tested, adjacent droplets in the temperature gradient coalesced more rapidly under the influence of the temperature gradient.

TABLE 1

The sizes and the initial positions of droplets.

| Droplets | | AM*, mm | LM, mm | Initial position, mm |
|---|---|---|---|---|
| n-Decane | Large | 0.22 | 0.72 | 0.64 |
| | Small | 0.15 | 0.50 | 0.54 |
| n-Undecane | Large | 0.29 | 0.84 | 0.97 |
| | Small | 0.15 | 0.48 | 0.55 |
| n-Dodecane | Large | 0.31 | 0.94 | 0.77 |
| | Small | 0.16 | 0.52 | 0.58 |
| n-Hexadecane | Large | 0.26 | 0.75 | 0.49 |
| | Small | 0.16 | 0.47 | 0.43 |

*The distance AM includes the radius of the fiber that supports the droplet.

As mentioned above, the operation of this invention is independent of its orientation relative to gravity. For example, the temperature gradient may be applied in the direction of gravity, perpendicular to it, or even in the opposite direction of gravity. Therefore, it is envisioned that this invention could also be used to separate liquids from gases in microgravity environments such as those encountered in an orbiting space vehicle.

It is also envisioned that the temperature gradient may be created in a variety of ways. For example, the temperature gradient may be created by heating an element in contact with the filter, or by heating an element located within the filter. Examples of the later option include a heated wire, a heated wire mesh, or a heated perforated plate.

It is likewise envisioned that a temperature gradient may be created in a filter independent of the shape or dimensions of the filter. A temperature gradient may be created in a flat medium, such as a mat that extends in planar two dimensions, or in other curved structures such as cylinders, cones or spheres.

It is further envisioned that a temperature gradient may vary, not only in its strength, but also in its duration. The heating and/or cooling may be applied to the fiber or fibers in such a way that the temperature gradient is either continuous or intermittent in one direction. The heating and/or cooling may also be applied such that the temperature gradient reverses direction periodically.

Based upon the foregoing disclosure, it should now be apparent that the use of a temperature gradient to induce movement of liquid along a fiber or network of fibers will carry out the aspects and objects set forth hereinabove. The present invention offers advantages within the field of coalescence filtration that have previously been unavailable from prior methods. It is, therefore, to be understood that any variations evident fall within the scope of the claimed invention and thus, the selection of specific component elements can be determined without departing from the spirit of the invention herein disclosed and described.

We claim:

1. A method for removing a liquid from a gas, comprising:
   passing the gas and the liquid through a network of fibers containing at least one fiber in which a temperature gradient has been induced along at least a portion of the length of the fiber, thereby permitting droplets of the liquid to be captured by the at least one fiber, and wherein the temperature gradient is induced immediately prior to or during the removal method and causes migration of the droplets along the at least one fiber.

2. The method of claim 1 wherein the droplets migrate toward the lower temperature region of the at least one fiber.

3. The method of claim 2, wherein the temperature gradient is at least 0.1° C. per millimeter.

4. The method of claim 3 wherein the temperature gradient is at least 1° C. per millimeter.

5. The method of claim 4, wherein the temperature gradient is at least 3° C. per millimeter.

6. The method of claim 5 wherein the temperature gradient is at least 10° C. per millimeter.

7. The method of claim 2 wherein the at least one fiber has an average diameter between about 0.3 nanometers and about 1 millimeter.

8. The method of claim 7 wherein the at least one fiber has an average diameter between about 3 and about 60,000 nanometers.

9. The method of claim 7 wherein the at least one fiber has an average diameter between about 30 and about 3,000 nanometers.

10. The method of claim 7 wherein the at least one fiber has an average diameter between about 100 and about 1,000 nanometers.

11. The method of claim 2 wherein the at least one fiber is selected from the group consisting of polymer fibers, silica fibers, and ceramic fibers.

12. The method of claim 2 wherein the liquid comprises at least one hydrocarbon.

13. The method of claim 2 wherein the liquid is selected from the group consisting of $C_{10}$–$C_{16}$ hydrocarbons, petroleum oils and vegetable oils.

14. A method of preventing the fouling of a coalescence filter, the method comprising:
    inducing a temperature gradient along at least a portion of a length of at least one fiber within the filter containing a network of fibers, wherein the temperature gradient is induced immediately prior to or during the anti-fouling method, and causes migration of liquid droplets captured by the at least one fiber.

15. The method of claim 14, wherein the liquid droplets migrate toward the lower temperature region of the at least one fiber.

16. The method of claim 15, wherein the temperature gradient is at least 0.1° C. per millimeter.

17. The method of claim 15, wherein the at least one fiber has an average diameter between about 0.3 nanometers and about 1 millimeter.

18. The method of claim 15, wherein the at least one fiber is selected from the group consisting of polymer fibers, silica fibers, and ceramic fibers.

19. The method of claim 15, wherein the liquid droplets comprise at least one hydrocarbon.

20. The method of claim 15, wherein the liquid droplets are selected from the group consisting of $C_{10}$–$C_{16}$ hydrocarbons, petroleum oils and vegetable oils.

21. A purified gas, wherein the gas has been purified by the method of claim 1.

22. A coalescence filter medium comprising:
    at least one fiber in which a temperature gradient is induced along at least a portion of the length of the fiber immediately prior to or during usage of the filter medium.

23. The coalescence filter medium of claim 22, wherein the at least one fiber is selected from the group consisting of polymer fibers, silica fibers, and ceramic fibers.

24. The coalescence filter medium of claim 22, wherein the diameter of the at least one fiber is between about 0.3 nanometers and about 1 millimeter.

25. The coalescence filter medium of claim 22, wherein the temperature gradient is at least 0.1° C. per millimeter.

26. The coalescence filter medium of claim 22, additionally comprising a network of support fibers.

27. A coalescence filter comprising the medium of claim 22.

28. The coalescence filter of claim 27, additionally comprising a liquid collector.

* * * * *